United States Patent [19]

Kazmierczak

[11] Patent Number: 5,734,142
[45] Date of Patent: Mar. 31, 1998

[54] METHOD OF WELDING ELECTRICALLY CONDUCTIVE METAL PROFILES

[75] Inventor: John Kazmierczak, Waterloo, Wis.

[73] Assignee: Trek Bicycle Corporation, Waterloo, Wis.

[21] Appl. No.: 684,473

[22] Filed: Jul. 19, 1996

[51] Int. Cl.⁶ .................................................. B23K 11/04
[52] U.S. Cl. ........................... 219/100; 219/160; 301/96; 301/99
[58] Field of Search ........................... 219/59.1, 97, 100, 219/101, 104, 105, 106, 117.1, 160; 301/95, 96, 97, 98, 99, 110.5

[56] References Cited

U.S. PATENT DOCUMENTS

| | | |
|---|---|---|
| 1,441,004 | 1/1923 | Kranz . |
| 1,518,283 | 12/1924 | Theberath . |
| 1,912,993 | 6/1933 | Murray, Jr. ............... 219/106 |
| 3,412,226 | 11/1968 | Kolb ........................ 219/101 |
| 3,433,327 | 3/1969 | Regis . |
| 4,142,394 | 3/1979 | Damman . |
| 4,529,253 | 7/1985 | Ho . |
| 5,470,133 | 11/1995 | Kuo et al. ................ 301/95 |
| 5,499,864 | 3/1996 | Klein et al. .............. 301/95 |

FOREIGN PATENT DOCUMENTS

| | | |
|---|---|---|
| 0 579 525 A1 | 1/1994 | European Pat. Off. . |
| 0947407 | 7/1949 | France . |
| 2351803 | 4/1975 | France . |
| 2 614 844 | 11/1988 | France . |
| 962318 | 4/1957 | Germany . |
| 57-205060 | 12/1982 | Japan . |
| 1122701 | 5/1989 | Japan . |
| 2051 700 | 1/1981 | United Kingdom . |

OTHER PUBLICATIONS

Automation International Incorporated, Assurance Instruction Manual (24 pages).

Method for Manufacturing a Rim for a Cycle and Rim Obtained With This Method, P11889.SO1 (28 pages).

*Primary Examiner*—Clifford C. Shaw
*Attorney, Agent, or Firm*—Nilles & Nilles, S.C.

[57] ABSTRACT

A method of flash/butt welding an aluminum bicycle wheel rim, in which an aluminum sleeve having a dielectric anodized hardcoat surface finish is inserted into the center of the rim in order to support the interior walls of the rim during the welding process, is disclosed. The walls of a wheel rim or other similar metal profile defines an inner space in a tubular section of the rim. The sleeve is partially inserted into a first end of the rim and partially inserted into a second end of the rim. During the welding process, an electric current flows across a small space or gap between the two ends. The electric current melts the ends, at which time the two ends are pressed together in order to forge them into a single piece. The metal sleeve supports the inner walls of the profile in order to prevent collapse of the wall during welding. Due to the dielectric coating, the sleeve does not affect the welding circuit.

30 Claims, 3 Drawing Sheets

METHOD OF WELDING ELECTRICALLY CONDUCTIVE METAL PROFILES

BACKGROUND OF THE INVENTION

1. Field of the Invention

The present invention relates to a method of welding electrically conductive metal profiles. In particular, the present invention relates to a method of flash/butt welding an aluminum bicycle wheel rim in which a metal sleeve having a dielectric surface finish is inserted into the center of the rim in order to support the interior walls of the rim during the welding process.

2. Background of the Related Art

A bicycle wheel rim may be manufactured by bending an extruded metal profile into a circular rim and connecting the two ends of the profile together. The methods heretofore employed for connecting the two ends of the profile together to form the rim have included various means for mechanically coupling the two ends, and, more recently, welding the two ends together. For obvious reasons, there is a desire to produce increasingly lighter bicycles and bicycle wheel rims. Unfortunately, current methods of connecting the two ends of a wheel rim together require the walls of the rim to have a certain minimum thickness or mass, otherwise the rim is subject to failure at the joint. Other drawbacks are also encountered.

For example, one method of mechanically coupling a wheel rim together involves placing a short sleeve inside the wheel rim, and, on both ends, pinning or riveting the rim to the sleeve. In this method, the pin or rivet protrudes through the outer walls of the rim. Therefore, the walls of the rim, must have a certain minimum thickness in order to be strong enough to hold the pin. Also, mechanically pinning the two ends of the rim together leaves a step or edge in the surface of the rim where the two ends meet. This step or edge interferes with the operation of the break pad, and causes accelerated wear of the pad, which is undesirable.

Another method of mechanically coupling the rim together involves simply press fitting the sleeve into the rim (i.e., without the additional pin or rivet), but it is difficult to manufacture an extruded profile to the proper tolerance in order to consistently press fit the parts together. This method also leaves a step or edge in the surface of the rim which rubs down the brake pad.

Welding is another method currently employed to manufacture wheel rims. Since the wheel rim is made from an electrically conductive metal, the rim may be welded through the use of an electrical welding process. Such processes include "butt welding" and "flash welding" (sometimes referred to as "flash/butt welding").

In butt welding, an electric current is used to heat the two ends of the profile while the two ends are pressed together. Because the two ends are in electrical contact with each other during the butt welding process, the surface of each end must be perfectly smooth and precisely aligned. Any defects in the surface will cause the electric current to become localized, resulting in uneven welding and defects in the welded joint. This problem can be solved to some limited extent by using sophisticated machining processes for ensuring that the two ends of the profile are smooth, flat and precisely aligned. Regardless of the degree of care in preparing the surface for butt welding, the butt welding process is nonetheless limited by the fact that the walls of the metal rim must be thick enough in order to provide enough material to properly weld the two ends of the part together. If the walls are too thin, the welded joint may still buckle even if the surface of the parts have been properly prepared prior to welding.

The current practice of flash/butt welding suffers a similar drawback. The flash/butt weld process also uses an electric current to heat the metal. During the flash/butt weld, the two ends are separated by a small gap, and the electric current flows across the gap in the form of a spark from one end to the other. The electric current essentially vaporizes and melts the ends of the profile, which are then quickly pressed together. The flash/butt weld process is less prone to problems associated with misalignment and uneven surfaces of the parts, but nonetheless the walls of the wheel rim must have a certain minimum thickness to be properly welded.

The problem in welding a hollow wheel rim essentially arises from the fact that the rim has an inner space which cannot be supported with any type of fixturing during the welding process. Obviously, the exterior walls of the rim can be supported with a die or fixture, but the inner space of the rim is inaccessible. Since the inner wall of the rim is unsupported during the welding process, the heated walls of the rim tend to collapse inward into the inside of the rim, resulting in bending, dimpling, creation of voids, and other defects in the rim.

Consequently, in view of the desire to produce increasingly lighter bicycles and bicycle wheel rims, there is a need for an improved method of welding an electrically conductive profile which solves the above-mentioned problems.

SUMMARY OF THE INVENTION

A method of welding an electrically conductive metal profile, in particular a hollow bicycle wheel rim, which includes inserting a metal sleeve or insert into the inner space of the profile, wherein the sleeve has an electrically non-conductive surface finish, is disclosed.

A bicycle wheel rim is comprised of a hollow extruded metal profile which has been bent into a circular rim. The walls of the profile define a geometric shape of an inner space in the profile. The method of the present invention includes partially inserting the metal sleeve into the inner space of a first end of the profile and into the inner space of a second end of the profile. During the welding process, an electric current flows across a small space or gap between the first end and second end of the profile. The electric current melts the two ends of the profile which are then pressed together in order to forge the two pieces into one. The sleeve is also made of metal so that it will withstand the high heat encountered during the welding process. However, since the sleeve has an electrically non-conductive surface finish, it will not disrupt or interfere with the electric current used to weld the two ends of the profile together.

The sleeve functions essentially as an internal fixture for supporting the inner surface of the walls of the profile during the welding process. The provision of such support in a manner which does not affect the electric welding current ensures that the profiles are precisely aligned and, more importantly, prevents the walls from collapsing into the inner space of the profile and thereby avoid the bending and dimpling of the metal and other defects which often occur in current methods of welding bicycle rims. Furthermore, the support provided by the sleeve during the welding process means that metal profiles having extremely thin walls can be adequately welded together. This result is particularly beneficial in welding bicycle parts, especially wheel rims, which can now be manufactured with extremely thin walls in order to reduce weight.

The principle objects of the invention are therefore to provide an improved method of welding bicycle wheel rims and other bicycle parts and metal profiles which comprises a means for supporting an inner wall of such profiles during the welding process; to provide a sleeve inserted into an inner space in the profiles during a welding process; to provide a non-conductive surface finish on such a sleeve so that it will not affect the electric current used during the welding process; and to provide a welding process which is capable of adequately welding together two ends of a bicycle rim having extremely thin walls.

Other objects and advantages of the invention will become apparent from the following description which, taken in conjunction with the accompanying drawings, sets forth by way of illustration and example certain embodiments of this invention.

BRIEF DESCRIPTION OF THE DRAWINGS

The drawings, which constitute part of this specification and include exemplary embodiments of the present invention, include the following.

DETAILED DESCRIPTION OF THE INVENTION

A bicycle wheel rim 10 is usually manufactured by taking an extruded metal profile and bending it into a circular ring. The profile is usually long enough to bend it into several circular rings and then sawed in order to separate the rings into individual wheel rims. The sawed ends are then welded together. Additional details relating to the manufacture of a bicycle wheel rim may be found, for example, in a patent application entitled Method in Manufacturing A Rim For A Cycle and Rim Obtained With This Method filed by Jean-Pierre LaComb on about Jul. 14, 1993, U.S. Ser. No. 08/091,038, now abandoned with a claim of priority based upon French patent application No. 92/08892, Filed Jul. 15, 1992, said application also published by the European Patent Office, publication No. 0579525 A1.

Figure 1:
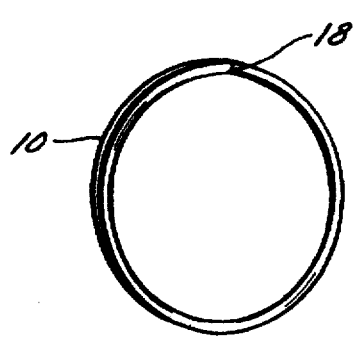
FIG. 1 is a perspective view of a welded bicycle wheel rim.
Figure 2:
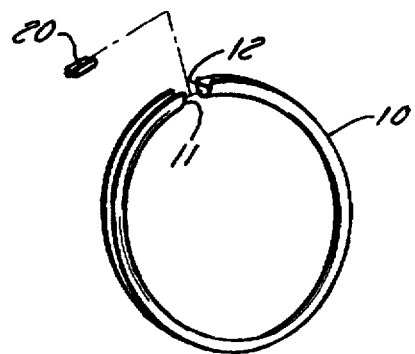
FIG. 2 is a perspective view of a bicycle wheel rim and a sleeve inserted into the rim to weld the two ends of the rim together.
Figure 4:
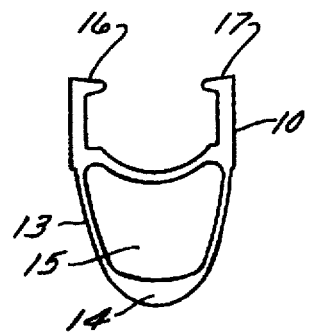
FIG. 4 is an end view of an end of a bicycle wheel rim to be welded.

For purposes of this description, the term "profile" is meant to include any metal part which may be welded using the process described below, and in particular a bicycle wheel rim 10 as depicted in FIGS. 1 and 4. Specifically, referring to FIG. 4, the profile used for fabricating a bicycle wheel rim 10 comprises an extruded aluminum alloy which includes a tubular portion 13 having walls which define a geometric shape of an inner space 15 of the profile, and a pair of rim flanges 16 and 17 projecting radially outward from the tubular portion 13 (upward in FIG. 4) to form a channel in which the bicycle tire and inner tube is placed. Although FIG. 4 depicts a profile having walls which define only a single inner space, the profile may be comprised of a series of walls which define a plurality of inner spaces. Also, reference will be made to a first end 11 of the profile being welded to a second end 12 of the profile.

Figure 10:
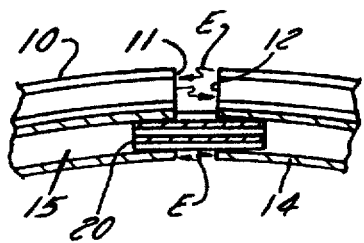
FIG. 10 is a partial cross-section view of a wheel rim and sleeve, and depicting an electric current flowing between the two ends of the wheel rim.
Figure 11:
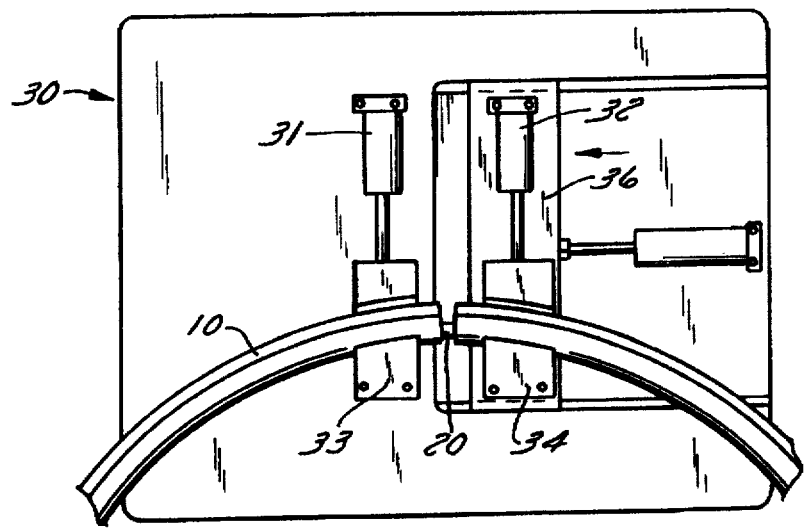
FIG. 11 shows a wheel rim clamped to a flash/butt welder at a point in the process where the clamp on the moveable platen of the welder is moving toward the clamp on the stationary platen in order to close the gap between the two ends of the wheel rim and forge them together.
Figure 13:
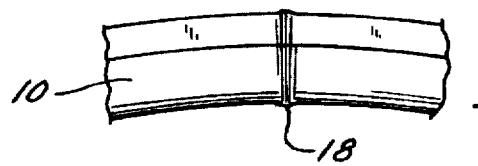
FIG. 13 is a partial view of a wheel rim in which the two ends have been welded together.
Figure 12:
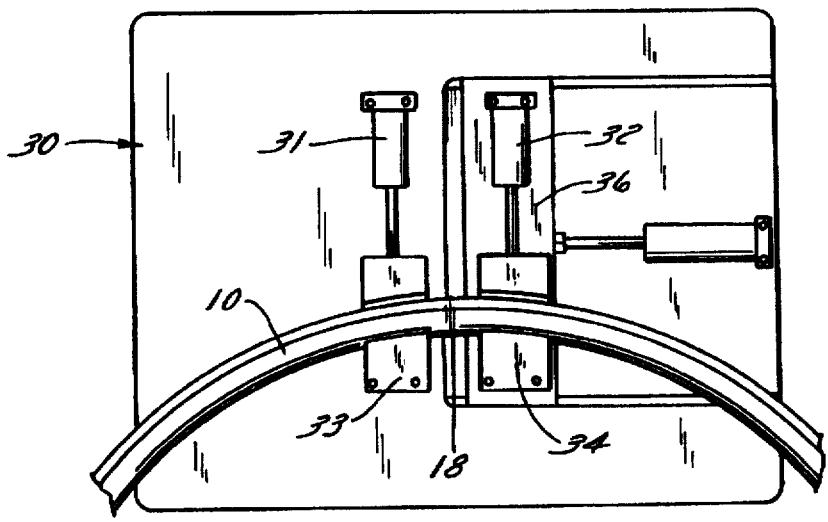
FIG. 12 shows a wheel rim clamped to a flash/butt welder in which the welding process has been completed.

The invention of a method for welding presented herein is particularly well suited for use in a flash/butt welding process. Flash/butt welding essentially consists of two major operations, heat and forging. On a flash/butt welder, the heating occurs during the flash of the weld. The flash is a constant burning at the edges of the part caused by an electrical current E flowing between the first end 11 and second end 12 of the part 10, as depicted in FIG. 10. As the metal is heated by the electrical current E, small pieces of the metal explode and eject into the air, causing a halo of sparks which gives the process its name. Upon heating of the metal, the two ends of the part 11 and 12 are rammed together in order to forge the two pieces into one.

Figure 8:
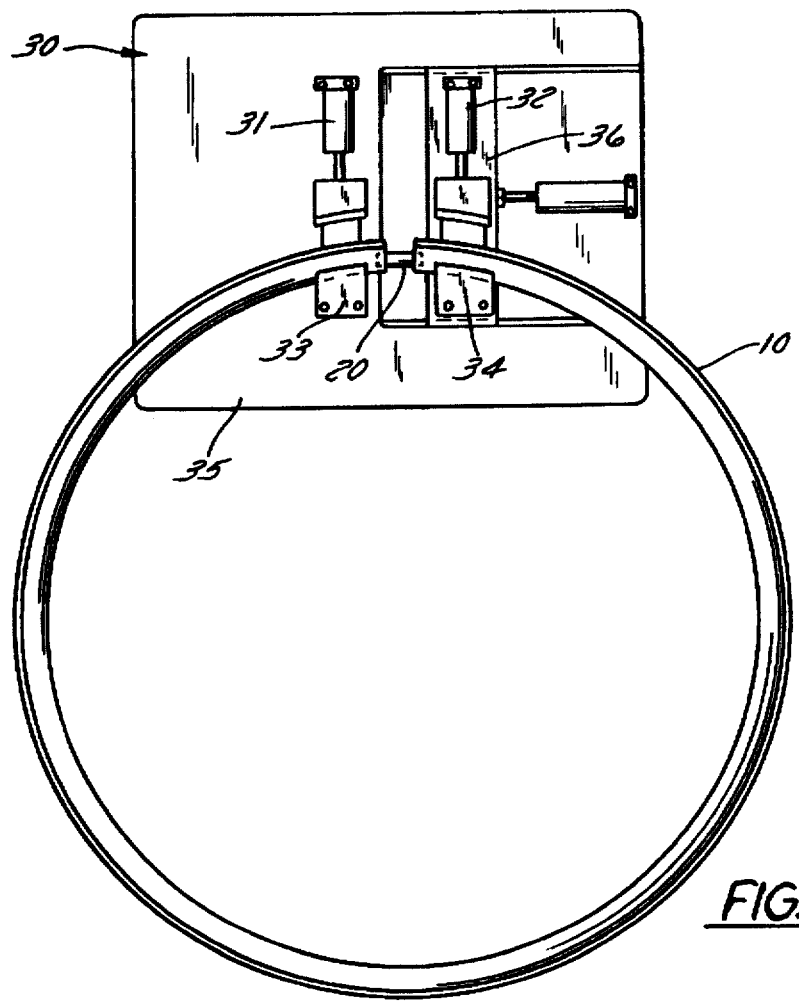
FIG. 8 shows a wheel rim mounted on a flash/butt welder with the clamps open.

Referring to FIG. 8, the basic hardware of an automated flash/butt welder 30 includes a first clamp 31 on a stationary platen 35, and a second clamp 32 on a movable platen 36. The clamps 31 and 32 are fitted with dies or fixtures 33 and 34, respectively, which are especially designed for holding the particular part being welded. The dies 33 and 34 are also used to channel the welding energy into the part. Therefore, the die 33 and clamp 31 on the stationary platen 35 are electrically isolated from the die 34 and clamp 32 on the moveable platen 36.

Referring to FIGS. 8–13, the process for flash/butt welding a metal profile generally comprises the following: (i) selecting a profile 10 to be welded and placing it on a flash/butt welding machine 30, (ii) clamping a first end 11 of the profile 10 to a first die 33, (iii) clamping a second end 12 of the profile 10 to a second die 34 on the machine 30, (iv) establishing a short space or gap between the first end 11 and second end 12 of the profile 10, (v) causing an electric current E to flow between the first end 11 and second end 12 of the profile 10 in order to burn off and heat the metal, (vi) moving the first end 11 and second end 12 of the profile 10 toward each other and pressing them together in order to forge the two pieces into one, and (vii) removing the profile 10 from the welder and grinding or polishing the surface of the welded joint 18 in order to provide a surface finish which makes the part aesthetically appear to be a continuous piece of metal.

Figure 3:
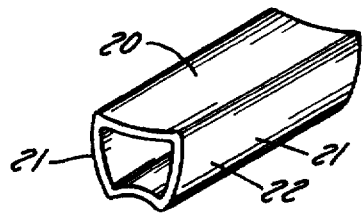
FIG. 3 is a perspective view of a sleeve used during the process of welding the ends of a bicycle wheel rim together.
Figure 5:
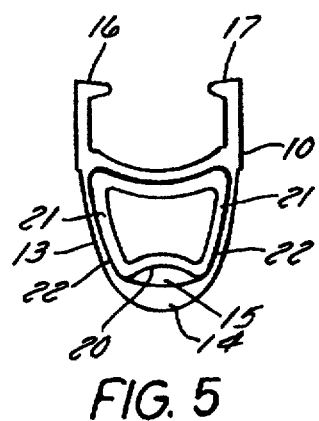
FIG. 5 is an end view of a bicycle wheel rim to be welded, with a sleeve inserted into the inner space of the wheel rim.
Figure 6:
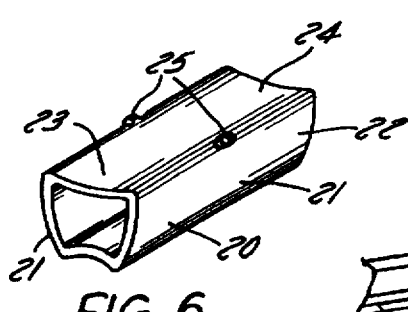
FIG. 6 is a perspective view of the sleeve, further showing dimples used to hold a partially inserted sleeve within the inner space of the rim.
Figure 7:
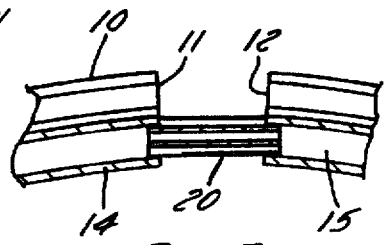
FIG. 7 is a cross-section view of a wheel rim and sleeve of the present invention.
Figure 9:
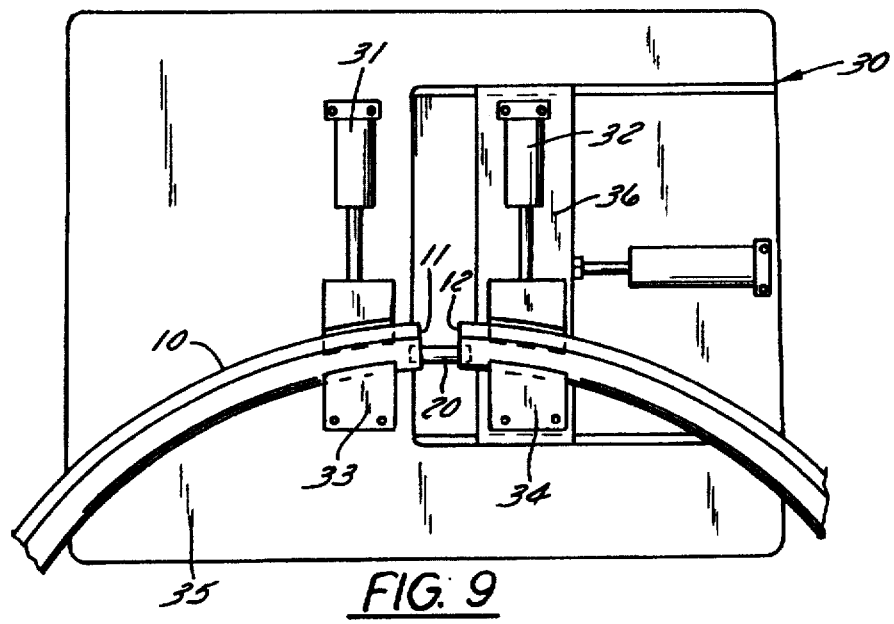
FIG. 9 shows a wheel rim mounted on a flash/butt welder with the clamps closed.

As mentioned above, the dies or fixtures 33 and 34 on the welder 30 are unable to support the inner walls of the profile 10. Accordingly, under the principles of the present invention, a sleeve 20 is inserted into the inner space 15 of the profile 10 prior to welding. Referring to FIGS. 3, 5 and 6, the sleeve 20 is comprised of a relatively short metal piece having walls 21 which define a second geometric shape which fits snugly within the inner space 15 of the profile 10. The sleeve 20 is likewise made of metal, preferably the same material that the profile 10 is made of, however, the sleeve 20 further comprises a dielectric, (i.e., electrically non-conductive) surface finish 22. By being made of metal, the sleeve 20 is able to survive the high heat encountered during the welding process. Since the entire surface of the sleeve 20 is dielectric, the sleeve will not disrupt or interfere with the electric current E being used to weld the two ends together.

Prior to welding, a first portion 23 of the sleeve 20 is partially inserted into the first end 11 of the profile 10, and a second portion 24 of the sleeve 20 is partially inserted into the second end 12 of the profile 10. A dimple 25 at approximately the center of the sleeve 20 abuts against the wall 14 of the profile 10 in order to prevent the sleeve 20 from sliding completely inside the wheel rim 10. Also, during welding when the edges of the two ends of the rim are being burned off, the notch 25 keeps the sleeve 20 generally centered relative to the first and second ends of the profile so that the sleeve 20 won't slip too far to one side and become disengaged from the other.

The sleeve 20 serves essentially the same purpose as the dies 33 and 34 in that it supports the softened metal wall 14 of the profile 10 during the welding process. Since the walls 14 of the profile 10 are supported on the inside by the sleeve 20 and supported on the outside by the dies 33 and 34, defects such as bending, dimpling, misalignment, voids and other potential defects in the weld are avoided. Furthermore, by supporting both the inner and outer surfaces of the walls of the profile 10 during the welding process, profiles having very thin walls can be properly welded together without encountering structural defects at the welded joint. Reducing the thickness of the walls means, obviously, reducing the weight of the part, which is very important especially in the bicycle industry.

Although the above described process is capable of welding together virtually any type of electrically conductive metal profile, it is particularly well adapted for use in welding together the two ends of a bicycle wheel rim, especially aluminum rims, such as those made of Aluminum Association 6061 or 6005 alloys. In that case, the sleeve is also preferably made of the same aluminum alloy and anodized with a hardcoat finish.

Anodized aluminum is aluminum with a hard aluminum oxide surface imparted electrolytically using the metal part as the anode. An anodized surface finish, which is much thicker than the naturally formed aluminum oxide film, is bound directly to the part. More importantly, a hardcoat anodized finish is electrically non-conductive.

Although the welding process described above has been in specific reference to the manufacture of a bicycle wheel rim, a number of modifications or derivative forms of the invention described herein are possible. For example, the profile may be comprised of a series of walls defining a plurality of inner spaces, such as a honeycomb configuration, with inserts placed in some or all of the spaces. The sleeve may be made from other types of material which can withstand the high temperatures during welding, such as high temperature plastics and ceramics. Other types of electrically non-conductive surface finishes are available. Finally, the process is suitable for welding a wide range of products other than just bicycle wheel rims.

Therefore, specific structural and functional details disclosed above are not to be interpreted as limiting, but merely as a basis for the claims and teaching one skilled in the art to variously employ the present invention in any appropriately detailed manner. Changes may be made in the details of construction, arrangement or operation of the invention without departing from the spirit of the invention, especially as defined in the following claims.

I claim:

1. A method of welding comprising:
    selecting an electrically conductive metal profile, said profile having a first end and a second end, and further having walls which define an inner space in said profile;
    selecting a sleeve having walls which define a geometric shape which fits snugly within the inner space of said profile, said sleeve further having a non-conductive surface finish;
    partially inserting a first portion of said sleeve into the first end of said profile, and partially inserting a second portion of said sleeve into the second end of said profile;
    causing an electric current to flow between the first end and second end of said profile in order to heat said first and second ends; and,
    forging the first end and second end of the profile together;
    wherein the sleeve supports the walls of the inner space of the profile during welding.

2. The method of claim 1, further comprising making said sleeve from the same type of material as the profile.

3. The method of claim 2, further comprising making said profile and said sleeve from an aluminum alloy.

4. The method of claim 1, further comprising hardcoat anodizing said sleeve in order to provide said non-conductive surface finish thereon.

5. The method of claim 1, further comprising:
    clamping said profile to a pair of electrically isolated dies on a flash/butt welder;
    energizing said dies in order to cause the electric current to flow between the first end and second end of said profile; and
    moving one end of the profile toward the other in order to weld the two ends of the profile together.

6. The method of claim 1, wherein the profile comprises a bicycle part.

7. The method of claim 6, wherein the profile comprises a bicycle wheel rim.

8. The method of claim 1, wherein said profile comprises a series of walls which define a plurality of inner spaces, and the method further comprises inserting a sleeve into at least one such inner space.

9. The method of claim 8, further comprising inserting a sleeve into each inner space.

10. A method of welding comprising:
    selecting an electrically conductive metal profile to be welded, said profile having walls which define an inner space in said profile;
    clamping a first end of said profile to a first die;
    clamping a second end of said profile to a second die;
    separating the first end from the second end to provide a short gap therebetween;
    partially inserting a sleeve into the inner space of the first end of the profile and into the inner space of the second end of the profile to thereby bridge said gap, said sleeve having a non-conductive surface finish;
    causing an electric current to flow between the first end and second end of the profile; and closing the gap to thereby forge the two ends of the profile together.

11. The method of claim 10, further comprising:

selecting a sleeve having a geometric shape which fits snugly within the inner space in said profile; and, using said sleeve to support the walls of the profile as the two ends of the profile are forged together.

12. The method of claim 10, further comprising making said sleeve from the same type of material as the profile.

13. The method of claim 12, wherein the material comprises an aluminum alloy.

14. The method of claim 13, further comprising hardcoat anodizing said sleeve in order to provide said non-conductive surface finish.

15. The method of claim 10, wherein the profile comprises a bicycle part.

16. The method of claim 15, wherein the profile comprises a bicycle wheel rim.

17. A wheel rim for a bicycle comprising:

an electrically conductive metal profile, said profile comprising:
    a circular ring in which a first end of said profile is welded to a second end of said profile in order to form said rim; and
    walls which define an inner space in said profile; and
a sleeve in the inner space of said profile, said sleeve comprising:
    a first portion inserted into the first end of said profile and a second portion inserted into the second end of said profile;
    walls which define a geometric shape such that said sleeve fits snugly within the inner space of said profile; and
    a non-conductive surface finish.

18. The wheel rim of claim 17, wherein the sleeve further comprises a means for holding the first portion of the sleeve in the inner space in the first end of said profile.

19. The wheel rim of claim 18, wherein the means for holding the sleeve comprises a dimple in the wall of the insert.

20. The wheel rim of claim 17, wherein the profile and insert are comprised of the same metal.

21. The wheel rim of claim 20, wherein the metal comprises an aluminum alloy.

22. The wheel rim of claim 21, wherein the surface finish of the insert comprises a hardcoat anodized finish.

23. A sleeve for electrically welding together a first end and a second end of an electrically conductive metal profile, said profile having walls which define an inner space in said profile, said sleeve comprising:

a metal piece having:
    a length such that said sleeve may be partially inserted into the inner space in the first end of said profile, and, upon welding the first end and second end together, partially inserted into the second end of said profile;
    walls which define a geometric shape such that said sleeve fits snugly within the inner space of said profile; and,
    a non-conductive surface finish.

24. The sleeve of claim 23, further comprising a means for holding a partially inserted sleeve within the inner space of said profile.

25. The sleeve of claim 24, wherein the means for holding a partially inserted sleeve comprises a dimple at approximately the center of the length of said sleeve, wherein said dimple abuts against the wall of said profile upon insertion of the sleeve into said profile.

26. The sleeve of claim 23, wherein the sleeve is comprised of the same metal as the metal profile.

27. The sleeve of claim 26, wherein the metal comprises an aluminum alloy.

28. The sleeve of claim 23, wherein the surface finish comprises a hardcoat anodized surface finish.

29. The sleeve of claim 23, wherein the profile comprises a bicycle part.

30. The sleeve of claim 29, wherein the profile comprises a bicycle wheel rim.

* * * * *